United States Patent [19]

Morimoto et al.

[11] Patent Number: 4,609,694

[45] Date of Patent: Sep. 2, 1986

[54] PROCESS FOR PREPARING METAMORPHOSED ALKALINE TITANATES

[75] Inventors: Takuo Morimoto, Kyoto; Kihachiro Nishiuchi; Kenichi Wada, both of Tokushima, all of Japan

[73] Assignee: Otsuka Chemical Co., Ltd., Osaka, Japan

[21] Appl. No.: 672,791

[22] Filed: Nov. 19, 1984

[30] Foreign Application Priority Data

Nov. 21, 1983 [JP] Japan ................................. 58-220352

[51] Int. Cl.$^4$ ............................................. C01G 23/00
[52] U.S. Cl. .................................... 423/598; 252/516; 252/520
[58] Field of Search ................. 423/598; 252/516, 520

[56] References Cited

U.S. PATENT DOCUMENTS 4,001,145  1/1977  Sakai et al. .......................... 252/516

FOREIGN PATENT DOCUMENTS 135129  8/1983  Japan .................................. 423/598
135130  8/1983  Japan .................................. 423/598

*Primary Examiner*—H. T. Carter
*Attorney, Agent, or Firm*—Stiefel, Gross, Kurland & Pavane

[57] ABSTRACT

A process for preparing metamorphosed alkaline metal titanates which comprises heating a mixture of at least one alkaline metal compound capable of being decomposed into an oxide of the alkaline metal and a gas by heating, and titanium dioxide, under a non-oxidative atmosphere, in the presence of at least one carbide represented by the formula $$C(M)_z \qquad (1)$$

wherein M is an element except carbon selected from groups III, IV and V in Periodic Table, and z is an integer corresponding to valency of M.

The products have excellent heat resistance and electroconductivity and are useful as insulating materials.

14 Claims, No Drawings

PROCESS FOR PREPARING METAMORPHOSED ALKALINE TITANATES

BACKGROUND OF THE INVENTION

1. Field of the Invention

The present invention relates to a process for preparing a metamorphosed alkali metal titanate.

2. Description of the Prior Art

Alkali metal titanates are represented by the formula $$Ma_2O \cdot nTiO_2 \cdot mH_2O$$

wherein Ma is an alkali metal, n and m are respectively an integer not more than 10, and are well known as insulating materials having excellent heat resistance and high refractive index. Recently, many attempts have been made to modify or metamorphose such alkali metal titanates, in accordance with diversified industrial needs. Thus, attempts have been with a view to lowering the insulating property of an alkali metal titanate or, in other words, making an alkali metal titanate semiconductive and further conductive, without extinction of its heat resistance and its reinforcing property for composites owing to its shape, or with a view to coloring an alkali metal titanate having in general a large refractive index and high whiteness and being difficult to apply to colored materials, into black, blue, etc.

Heretofore, there has been a well known process for making an alkali metal titanate electroconductive, for example, by heating and metamorphosing a mixture of titanium dioxide and various sodium salts under a hydrogenous atmosphere to form a hydrogenated sodium titanate. In such process, it was necessary to heat the above-mentioned mixture at a high temperature of approx. 800° to 1200° C. in a hydrogenous atmosphere. The heating at a high temperature in a hydrogenous atmosphere, however, is extremely dangerous. That is, the known process involved various problems to be solved for the insurance of safety, with regard to manufacturing equipments and process controls. Furthermore, hydrogenated sodium titanates obtained by said process release hydrogen and as a result lose conductivity when they are brought in contact with an oxidative atmosphere. Thus, the sodium titanates were restricted in application.

Under the circumstances, the inventors of the present invention have already proposed processes to prepare metamorphosed alkali metal titanates in the presence of a carbonous compound under a non-oxidative atmosphere (Japanese Patent Laid-open Nos. sho.58-135129 and sho.58-135130). However, it has been noted after further investigation that the carbonous compounds used in said processes and contained in the metamorphosed alkali metal titanates (1) lower the heat resistance characteristic of alkali metal titanates and (2) decrease the bulk density, and accordingly there is difficulty in mixing and dispersion of the products with other materials to obtain composites. Thus, it was necessary to separate the carbonous compounds in order to obtain metamorphosed alkali metal titanates having excellent heat resistance.

It is an object of the present invention to provide a novel process for preparing metamorphosed alkali metal titanates having excellent heat resistance and electroconductivity, which are free from disadvantages as mentioned above.

SUMMARY OF THE INVENTION

The present invention provides a process for preparing metamorphosed alkali metal titanates which comprises heating a mixture of at least one alkali metal compound capable of being decomposed by heating into an oxide of the alkali metal and a gas and titanium dioxide, under a non-oxidative atmosphere, in the presence of at least one carbide represented by the formula $$C(M)_z \qquad (I)$$

wherein M is an element except carbon selected from Groups III, IV and V in the Periodic Table, and Z is an integer corresponding to the valency of M.

DESCRIPTION OF THE PREFERRED EMBODIMENT

The metamorphosed alkali metal titanates obtained according to the process of this invention may take various embodiments depending on the composition of raw materials and the conditions of metamorphosis.

Although the reaction mechanism is not thoroughly clarified, the process of this invention is free from such danger as involved in conventional hydrogenation processes and does not cause any lowering of heat resistance owing to the remaining carbonous compounds as noticed in the hydrogenated alkali metal titanates obtained by the known processes using a carbonous compound. It is assumed that the carbide, an essential component of the process of this invention, is also metamorphosed into a conductive one because the resultant metamorphosed alkali metal titanate is provided with conductivity even when it contains said carbide, although the reaction mechanism is also not fully clarified. Hence, the process according to the present invention is extremely advantageous as a method of providing conductive compounds having excellent heat resistance. Furthermore, the metamorphosed alkali metal titanates of the present invention show no lowering in conductivity even when they are in contact with an oxidative atmosphere.

The alkali metal compounds capable of being decomposed by heating into alkali metal oxides and gases according to the process of this invention (hereinafter referred to merely as "alkali metal compounds") include carbonates, hydroxides and halogenides of an alkali metal and organo-alkali metal compounds, more particularly sodium carbonate, sodium hydrogen carbonate, potassium carbonate, potassium hydrogen carbonate, lithium carbonate, sodium hydroxide, potassium hydroxide, lithium hydroxide, sodium chloride, sodium bromide, sodium iodide, sodium fluoride, potassium chloride, potassium bromide, potassium iodide, potassium fluoride, lithium chloride, sodium alcoholate, potassium alcoholate, lithium alcoholate, rubidium hydroxide, cesium hydroxide, etc. Alkali metal carbonates among them can be preferably utilized, as they are available at low prices and the non-oxidative atmosphere can be maintained by them easily.

Both amorphous and crystalline (anatase type and rutile type) titanium dioxides may be used as the titanium dioxide according to the present invention. Those various forms of titanium dioxide may be properly selected and used in accordance with the conditions of metamorphosis as mentioned below.

Well known compounds can be widely used as the carbides represented by the formula (I), and they include boron carbide, silicon carbide, titanium carbide, germanium carbide, tin carbide, lead carbide, phosphorus carbide, etc. Preferred among them are silicon carbide, boron carbide, titanium carbide, etc. They may be used either individually or as a mixture of two or more of them.

The qualities of titanium dioxides, alkali metal compounds and carbides are not specified in the present invention. However, highly pure ones are preferred when the products are used for electric and electronic applications. Moreover, those of small particle size are preferred in order to carry out the reaction rapidly. As for the carbides, it is preferred that their size is not larger than several $\mu$m.

The mixing ratio of titanium dioxide and alkali metal compound is not limited specifically and can be selected from a wide range of values. However, it is preferred that they are mixed in such ratio that the numbers of titanium atom to the numbers of alkali metal atom (Ti/Ma) are 1:1 to 10:1, more particularly 1:3 to 8:1. The amount of the carbide represented by the formula (I) is also not limited specifically and can be selected from a wide range of values. However, it is preferred to add usually 5 to 100% by weight, more particularly 10 to 40% by weight, of the carbide to the total amount of titanium dioxide and the alkali metal compound.

The non-oxidative atmosphere in the present invention means a non-oxidative atmosphere containing substantially more than 90% by volume of either one or a mixture of two or more of reducing gases (except hydrogen gas) such as carbon mono-oxide and inert gases such as nitrogen, helium, carbon dioxide, etc. Preferred among them are an atmosphere of nitrogen gas and carbon dioxide gas.

As a preferred embodiment of the heat treatment, a mixture of titanium dioxide, alkali metal compound and carbide may be simply charged into a container, deaerated and then heated. However, it is more preferable to admix with the mixture a compound that decomposes, vaporizes or burns at temperatures below 500° C. (hereinafter, such compound is referred to as "void-forming agent") and then heat the admixture, in order to perform the deaeration effectively and make fibrous growth of the alkali metal titanate easy. Thus, a void-forming agent is added to a mixture of titanium dioxide, alkali metal compound and carbide and the admixture is shaped into a molding, whereby the rate of voids before heating is reduced and migration of air into the molding is excluded as far as possible. As the molding thus obtained is heated in a non-oxidative medium at a temperature higher than that causes decomposition, vaporization or combustion of the void-forming agent, non-oxidative voids are formed in the molding as a result of decomposition, vaporization or incomplete combustion of the agent and hence the metamorphosed alkali metal titanate of the present invention can be made to grow in fibrous form.

As the void-forming agent according to the present invention, such compounds should be exluded that evolve a large amount of oxidative components by heating in a non-oxidative atmosphere. Compounds that are liquefied at room temperature or under the conditions of molding operation, and that act as binders when a mixture of titanium dioxide, alkali metal compound and carbide is molded, are more preferable from the viewpoint of the workability in molding. Such preferable void-forming agents include, for example, water, ammonia, amino compounds, hydrocarbon compounds, carbohydrate compounds, nitrogen-containing compounds, various synthetic resins, or mixtures of two or more of them. From the viewpoint of economy, water, hydrocarbon compounds, glycerol, ethylene glycol, carbohydrate compounds such as starch, saccharides, etc., nitrogen-containing compounds such as urea and its derivatives, polyvinyl alcohol, and synthetic resins such as butyral resin, polyvinyl acetate resin, atactic polyethylene, liquid polypropylene, polybutene, acrylic resin, etc. are especially preferred.

Although the amount of incorporating these void-forming agents may vary without limitation, it is preferred to use the agent in an amount not more than 50% by weight to the total amount of the mixture of titanium dioxide, alkali metal compound and carbide. Too large an amount of void-forming agent is undesirable because excessive energy is required for the decomposition, vaporization or combustion of the void-forming agent, having no direct relation to the reaction, and because the contact between titanium dioxide and alkali metal compound becomes insufficient and the reaction efficiency is decreased.

For the molding of the mixture of titanium dioxide, alkali metal compound, carbide and a void-forming agent, any conventional method wherein a uniform mixture prepared by a conventional method and heated at room temperature or at such temperature range that does not cause vaporization or decomposition of the void-forming agent is subjected to any one of the following molding processes:

(1) A process using a compression molding machine, wherein the mixture is filled into a mold and then compressed,
(2) A process using a granulating molding machine, wherein the mixture is put into a granulator to obtain granules or flakes,
(3) A process using a tablet machine, wherein the mixture is tabletted, and
(4) A process using press rolls, wherein the mixture is passed through the rolls to give a sheet.

However, it is preferred from the viewpoint of uniformity and efficiency of the heating, to effect the molding in such a way that the molding obtained has a larger surface area. In general, the thicker the molding, the larger the temperature gradient therein. It is necessary to control the thickness of moldings in order to avoid unevenness of the heating, i.e., unevenness of the metamorphosis.

The heat-treatment of the present invention may be performed by heating, under a non-oxidative atmosphere, an intimate mixture or a molding at a temperature higher than that which causes decomposition of the alkali metal compound or void-forming by the void-forming agent to deaerate it and subsequently at a temperature of 900° to 1300° C., preferably at a temperature not higher than 1200° C., still maintaining the non-oxidative atmosphere.

As a preferred embodiment of the heat-treatment, a method can be mentioned in which a molding consisting of a mixture of titanium dioxide, alkali metal compound, carbide and a void-forming agent is deaerated under a non-oxidative atmosphere such as nitrogen gas etc. at a temperature not higher than 100° C. to displace the air with the atmospheric gas, and then heated at an elevating rate of temperature of approx. 200° C./hr to form voids in the mixture, and heated and maintained at 900° to 1150° C. for metamorphosis, and thereafter cooled at a lowering rate of temperature of approx. 200° C./hr. The period of metamorphosis in this case may be 3 to 6 hrs.

The condition of the heat-treatment according to the present invention is not limited to the above-mentioned one, and may vary depending on the use or non-use of the void-forming agent and on the composition of raw materials. Thus, it may be enough to heat simply at 900° to 1200° C. under a non-oxidative atmosphere, whereby metamorphosed alkali metal titanates are obtained usually within 74 hrs.

The following Examples further illustrate the present invention. These Examples are given only for illustration of the invention and not for limitation of it.

EXAMPLE 1

10 g of anatase type titanium dioxide, 5 g of potassium carbonate and 3 g of silicon carbide (made by Nakarai chemicals Co., Ltd., Japan) were thoroughly mixed in a mortar. The mixture was charged in a boat-shaped 30 ml crucible made of highly pure alumina. The crucible was put into a tubular electric furnace made of highly pure alumina (inner diameter:50 mm, length:1 m), air in the furnace was displaced with nitrogen gas stream of 150 ml/min., and then heated and burned under the condition of a rate of elevating temperature of 200° C./hr., maintaining temperature of 970° C., and maintaining period for 3 hrs. under nitrogen stream of 50 ml/min., and then cooled to a temperature not higher than 200° C. at a rate of lowering temperature of 200° C./hr. The sample thus metamorphosed was put into 500 ml of water in a beaker, dipped for 10 mins., stirred at 200 rpm for 20 mins. and then separated into a fibrous portion and an aggregate. The aggregate was again treated in 500 ml of fresh water by the same procedure as above. Fibrous portions were gathered and filtered in vacuo, and dried at 100° C. for 3 hrs. to get 10.3 g of potassium titanate of fiber length of 7.2 $\mu$m colored in dark violet.

For comparison, the same experiment as above-mentioned except that silicon carbide was not used was carried out to give 5.2 g of white potassium titanate of fiber length of 6.5 $\mu$m. 5 parts of metamorphosed potassium titanate obtained as above, 8 parts of polydimethylsiloxanediol (made by Toshiba Silicon Co., Ltd., Japan), 2 parts of hexapropoxy phosphazine (made by Otsuka Chemicals Co., Ltd., Japan: SR 200) were mixed and dispersed in mixing equipment, to which 0.1 part of methyl trimethoxysilane and 0.05 part of dibutyl tin dilaurate were added. The mixture was spread on a Teflon sheet to give a thickness of approx. 5 mm. Thus the silicon elastomer containing metamorphosed potassium titanate of the present invention was obtained.

A specimen of 0.5 mm thickness, 2.0 cm width and 3.0 cm length was prepared from the above-mentioned elastomer, all surfaces of both ends (0.5×2.0 cm) of the specimen were covered with silver paste.

Conductivity of the elastomer was 13.8$\Omega$ when measured by Digital Multimeter (made by Takeda Riken Co., Ltd., Japan), and volume resistivity calculated by the following equation was 4.6$\Omega$ cm.

Volume resistivity $$= \frac{\text{measured resistance } (\Omega) \times \text{area of the electrode } (cm^2)}{\text{Distance between electrode } (cm)}$$

$$= \frac{13.8 \times 0.5 \times 2}{3.0} = 4.6$$

The same specimen was heated at 200° C. for 24 hrs., cooled to room temperature and its conductivity was measured to be 13.6$\Omega$, with no lowering of resistance. Similar experiment was carried out using the comparative sample of white potassium titanate. Its conductivity was not less than $10^{16}\Omega$, showing it to be an insulator.

EXAMPLE 2

4 g of anatase type titanium dioxide, 2 g of potassium carbonate, 2 g of silicon carbide (DENSIC ULTRAFINE, made by Showa Denko Co., Ltd., Japan) and 0.5 g of liquid paraffin as a void-forming agent were thoroughly mixed in a mortar, filled in a mold, pressed at 20 kg/cm$^2$ for 3 mins. to give a cylindrical mold of 10 mm diameter and 40 mm length. The resultant mold was put in a platinum boat, which was placed at the entrance part of a furnace as in Example 1, where air was replaced by nitrogen gas for 30 mins. Then, the heating under nitrogen atmosphere and the cooling were conducted in a same manner as in Example 1 to get a cylindrical sinter with dark violet color and some voids inside, the weight loss being less 30%. Both sides of the sinter were coated with silver paste, and the conductivity was measured with Digital Multimeter (made by Takeda Riken Co., Ltd., Japan) to be 10.8$\Omega$. Volume resistivity calculated by the following equation was 0.530$\Omega$ cm.

Volume resistivity =

$$\frac{\text{measured resistance } (\Omega) \times \text{area of the electrode } (cm^2)}{\text{Distance between electrodes } (cm)}$$

For comparison, the same experiment without using silicon carbide was carried out to obtain a white sinter. This sinter showed electrical insulation property. Fibrous portion was recovered from the sinter in the same manner as in Example 1 and analyzed with X-ray. It was confirmed to be potasium titanate with no metamorphosis.

EXAMPLE 3 TO 14

The mixtures of components shown in Table 1 were prepared by the same method as in Example 2, varying amounts of titanium dioxide, alkali compound, carbide and void-forming agent. Then metamorphosed potassium titanates were prepared by the same method as in Example 2 under various conditions shown in Table 1. The properties of the resultant metamorphosed alkali titanate were shown in Table 1.

The examples shown by "—" in the columns of rates of raising and lowering temperature, were made in such manner that the furnace was controlled to maintain at a previously given temperature and the samples were deaerated at the entrance part of the furnace and put immediately into the furnace maintained at the given temperature.

ratio of the number of titanium atoms to the number of alkali metal atoms is in the range of 1:1 to 1:10.

2. A method according to claim 1, wherein said alkali metal compound is selected from the group consisting of alkali metal carbonates, alkali metal chlorides and alkali metal oxalates.

3. A method according to claim 1, wherein said carbide is selected from the group consisting of silicon carbide and titanium carbide.

4. A method according to claim 1, wherein said mixture additionally comprises a void-forming agent that decomposes, vaporizes or burns at a temperature below 500° C.

5. A method according to claim 4, wherein said void-forming agent is selected from the group consisting of water, hydrocarbon compounds, glycerol, ethylene glycol, starch, saccharides, nitrogen-containing compounds, polyvinyl alcohol, synthetic resins, polyvinyl acetate resin, atactic polyethylene, liquid polypropylene, polybutene and acrylic resin.

6. A method according to claim 5, wherein said void-forming agent is liquid paraffin, ethylene glycol, glycerol, or polyvinyl alcohol.

7. A method according to claim 4 which additionally

TABLE 1

| Example No. | Components | | | | mixing ratio (by weight) A:B:C:D |
|---|---|---|---|---|---|
| | (A) titanium dioxide | (B) alkaline metal | (C) carbide | (D) void-forming agent | |
| 3 | anatase | potassium carbonate | silicon carbide | liquid paraffin | 1:2:1:0.8 |
| 4 | " | potassium carbonate potassium chloride | " | " | 1:2:1:0.8 |
| 5 | " | potassium hydrogen carbonate | " | ethylene glycol | 1:4:1:0.9 |
| 6 | " | potassium carbonate | titanium carbide | glycerol | 3:3:2:1.2 |
| 7 | " | 41 | silicon carbide | liquid paraffin | 3:3:2:1.2 |
| 8 | rutile | " | " | " | 1:2:1:0.8 |
| 9 | " | " | " | " | 1:2:1:0.8 |
| 10 | anatase | sodium carbonate | " | " | 1:1.8:1:0.8 |
| 11 | " | sodium hydrogen carbonate | titanium carbide | 10 v/v polyvinyl alcohol aq. soln. | 1:4:1:0.8 |
| 12 | " | sodium oxalate | silicon carbide | liquid paraffin | 3:3:2:1.5 |
| 13 | rutile | sodium carbonate | " | 2% CMC aqueous solution | 3:2.5:1:1 |
| 14 | " | " | " | liquid paraffin | 3:2.5:1:1 |

| Example No. | Condition of Metamorphosis | | | | Properties of the Product | |
|---|---|---|---|---|---|---|
| | rate of elevating temperature (°C./hr.) | temperature (°C.) | period (min.) | rate of lowering temperature (°C./hr.) | color | conductivity (ω, cm) |
| 3 | 200 | 1000 | 180 | 200 | dark violet | 0.310 |
| 4 | " | 1050 | 150 | " | blackish violet | 2.8 × 10$^{-2}$ |
| 5 | " | 1100 | 120 | " | " | 1.9 × 10$^{-2}$ |
| 6 | " | 1100 | 120 | " | " | 9.3 × 10$^{-3}$ |
| 7 | — | 1150 | 60 | — | violet brown | 1.4 × 10$^{-3}$ |
| 8 | 200 | 1050 | 150 | 200 | dark violet | 1.1 × 10$^{-3}$ |
| 9 | — | 1150 | 60 | — | violet brown | 2.7 × 10$^{-3}$ |
| 10 | 200 | 1100 | 120 | 200 | dark violet | 0.882 |
| 11 | — | 1150 | 60 | — | violet brown | 5.1 × 10$^{-2}$ |
| 12 | 200 | 1000 | 180 | 200 | bluish violet | 1.29 |
| 13 | " | 1150 | 60 | " | violet brown | 3.7 × 10$^{-3}$ |
| 14 | " | 1150 | 60 | " | " | 4.1 × 10$^{-3}$ |

What is claimed is:

1. A method of preparing electroconductive, heat resistant alkali metal titanates which comprises heating, under a non-oxidative, non-hydrogenous atmosphere, a mixture consisting essentially of at least one alkali metal compound capable of being decomposed by heating into an oxide of the alkali metal and a gas, and titanium dioxide, in the presence of at least one carbide of an element selected from Group IV of the Periodic Table, said titanium dioxide and said alkali metal compound being present in the mixture in such proportions that the comprises the steps of:
(a) molding the alkali metal compound, titanium dioxide, carbide and void-forming agent into a composite prior to heating;
(b) deaerating the composite under a non-oxidative atmosphere at a temperature not higher than 100° C.;
(c) gradually increasing the temperature of the atmosphere to between 900° and 1150° C. and maintaining the temperature at said level for 3 to 6 hours; and (d) gradually cooling the atmosphere and the composite to ambient temperature.

8. A method according to claim 1, wherein the non-oxidative atmosphere comprises more than 90% by volume of at least one gas selected from the group consisting of non-hydrogenous reducing gases and inert gases.

9. A method according to claim 8, wherein said reducing gas is carbon monoxide.

10. A method according to claim 8, wherein said inert gases are nitrogen, helium and carbon dioxide.

11. A method according to claim 1, wherein the carbide is present in an amount equal to 5 to 100% by weight of the total weight of titanium dioxide and the alkali metal compound.

12. A method according to claim 11, wherein the carbide is present in an amount equal to 10 to 40% by weight of the total weight of titanium dioxide and alkali metal compound.

13. A method according to claim 1, wherein the mixture is compressed together with the carbide under reduced pressure prior to heating.

14. A method according to claim 1, wherein said heating is effected at a temperature of 900° C. to 1300° C.

* * * * *

UNITED STATES PATENT AND TRADEMARK OFFICE
CERTIFICATE OF CORRECTION

PATENT NO. : 4,609,694
DATED : September 2, 1986
INVENTOR(S) : Takuo Morimoto et al.

It is certified that error appears in the above-identified patent and that said Letters Patent is hereby corrected as shown below:

Col. 1 [54], line 2, In the Title: change "ALKALINE" to --ALKALI--.

Col. 1, line 21: after "been" insert --made--.

Col. 3, line 33: change "1:3" to --3:1--.

Col 7, Example 7 TABLE 1 under "(B) alkaline metal": change "41" to --"--.

Col. 8, TABLE 1 second heading under "conductivity": change "($\omega$, cm)" to --($\Omega$, cm)--.

Signed and Sealed this

Seventeenth Day of May, 1988

Attest:

DONALD J. QUIGG

Attesting Officer

Commissioner of Patents and Trademarks